United States Patent [19]

Skudlarek

[11] Patent Number: 5,524,786
[45] Date of Patent: Jun. 11, 1996

[54] BODY CONFORMING FUEL TANK CAP LATCH MECHANISM

[75] Inventor: Donald A. Skudlarek, Troy, Mich.

[73] Assignee: Ford Motor Company, Dearborn, Mich.

[21] Appl. No.: 363,788

[22] Filed: Dec. 27, 1994

[51] Int. Cl.[6] ................................................ B65D 43/26
[52] U.S. Cl. .................... 220/262; 220/326; 220/375; 220/86.2; 220/DIG. 33; 292/32; 292/144; 292/162; 296/97.22
[58] Field of Search ................................. 220/210, 211, 220/262, 307, 326, 329, 375, 86.2, DIG. 33; 292/32, 144, 162; 296/97.22

[56] References Cited

U.S. PATENT DOCUMENTS

| | | |
|---|---|---|
| 3,126,728 | 6/1961 | Nehls . |
| 3,771,682 | 11/1973 | Chacos . |
| 4,294,376 | 10/1981 | Keller . |
| 4,575,136 | 3/1986 | Keller . |
| 4,809,869 | 3/1989 | Cosgrove et al. . |
| 4,830,058 | 5/1989 | Harris . |
| 5,031,790 | 7/1991 | Keller . |
| 5,044,678 | 9/1991 | Detweiler ............................ 292/144 |
| 5,161,706 | 11/1992 | Weinstein . |
| 5,381,919 | 1/1995 | Griffin et al. ........................ 220/307 |
| 5,385,256 | 1/1995 | Brown ................................... 220/323 |
| 5,437,491 | 8/1995 | Nedbal et al. ...................... 296/97.22 |

FOREIGN PATENT DOCUMENTS

| | | |
|---|---|---|
| 96604A | 5/1983 | European Pat. Off. . |
| 468849A | 7/1991 | European Pat. Off. . |
| 3930868A1 | 3/1991 | Germany . |

Primary Examiner—Allan N. Shoap
Assistant Examiner—Stephen Cronin
Attorney, Agent, or Firm—D. B. Kelley; R. L. May

[57] ABSTRACT

An automotive vehicle has a body with an external surface, a fuel tank filler pipe, and a fuel tank cap assembly comprising a plug sealingly engageable with the fuel tank filler pipe by insertion into the filler pipe to a rotatively fast sealing position, a cover carried with the plug that substantially blends with the body external surface when the plug is in the sealing position, and a latch mechanism carried with the fuel tank cap assembly operable without rotation of the cover to permit the assembly to move from the sealing position to a release position displaced from the body external surface, the latch mechanism also being operable in the release position through rotation of the cover to permit the assembly to move from the release position to a free position disengaged from the filler pipe.

15 Claims, 5 Drawing Sheets

BODY CONFORMING FUEL TANK CAP LATCH MECHANISM

BACKGROUND OF THE INVENTION

TECHNICAL FIELD

The present invention relates to latch mechanisms for automotive fuel tank closures in general, and more specifically to a latch mechanism for a body conforming fuel tank cap assembly which is nonrotationally actuated when in a sealing position yet rotationally actuated when in a released position displaced from the surrounding body surface.

DESCRIPTION OF THE PRIOR ART

In modern automotive vehicle design, it is desirable to provide access to the automobile's fuel tank for a gas station filler hose nozzle in a manner that complements the aerodynamic and aesthetic approach to the design of the vehicle body. Currently, the most commonly used approach is to provide a threaded gas cap at the end of a fuel filler pipe connected to the fuel tank with the gas cap being fully contained within a small compartment closed by a fuel filler door. Fuel filler doors are frequently hingedly connected to a portion of the automotive body and generally present an exterior surface which blends with the outer surface of the automotive body. The multiplicity of components required to achieve the design goals results in an outlay of cost and weight that is not desirable in all circumstances.

One approach to reducing the cost for accomplishing the desired functions has been to construct the gas cap so that it presents an outer surface that need not be enclosed by a body conforming fuel filler door. In certain designs, such an approach is aesthetically unacceptable. In others, it is an extremely limited design approach because the threaded gas cap must present a round surface to be outside of the vehicle body in order to conform with any aperture through which it will be inserted. That is to say, a variety of shapes in the outer surface of the gas cap is not possible.

These recited deficiencies in the related art were addressed in pending U.S. patent application Ser. No. 08/168,339, assigned to the assignee of the present invention and incorporated herein by reference. In that application, a fuel tank cap assembly was provided which included a plug portion sealingly engageable with a fuel tank filler pipe and a cover portion that is positionable in blending contiguous relationship with adjacent portions of the automotive vehicle body when the plug portion is positioned in a sealing position with respect to the fuel tank filler pipe. In a release position, the cap assembly stands proud of the vehicle body, and final removal from the filler pipe is accomplished through nonrotational actuation of a cap latch mechanism. The latch mechanisms allowed nonrotatable operation so that the cover portion would not be limited to circular shapes.

Nonrotational operation of the cap assembly, however, is unconventional from the standpoint that vehicle owners, gas station attendants, and others have become accustomed to rotating the cap to effect removal from the filler pipe. Since a non-circular shaped cover portion necessitates nonrotational operation when in the sealing position, the cap assembly must provide rotational unlatching of the gas cap from the filler pipe when in the release position standing proud of the body surface to meet consumer demands and desires.

SUMMARY OF THE INVENTION

Responsive to the above noted requirement, the present invention provides a latch mechanism carried with the fuel tank cap assembly operable without rotation of the cover to permit the assembly to move from a sealing position to a release position displaced from the body external surface, while also allowing the latch mechanism to operate in the release position through rotation of the cover to permit the assembly to move from the release position to a free position disengaged from the filler pipe.

One advantage of the present invention is a fuel tank cap assembly which embodies an outer surface complementary to the adjacent portions of the vehicle body which can be nonrotationally unlatched when in the sealing position, yet which can also be unlatched via rotation of the cover when in a release position standing proud of the vehicle body surface.

According to one feature of the present invention, latch means are provided operable without rotation of the cap assembly cover portion for releasably securing the fuel tank cap assembly to the filler pipe when in the sealing position.

According to another feature of the present invention, the latch means selectively limit movement of the fuel tank cap assembly from the release position toward the free position, the latch means operable to unlatch the assembly from the filler pipe through rotation of the cover portion when in the release position.

According to yet another feature of the present invention, the cover portion is rotated approximately one-eighth turn (or approximately 17°) to unlatch the fuel tank cap assembly when in the release position from the filler pipe.

According to still yet another feature of the present invention, a plug portion comprises a spring-loaded, telescoping assembly operatively disposed to urge the fuel tank cap assembly away from the sealing position toward the free position while simultaneously urging a seal against the plug portion seat in the filler pipe.

BRIEF DESCRIPTION OF THE DRAWINGS

These and other objects, advantages and features of the present invention will be apparent to those skilled in the automotive body arts upon reading the following description with reference to the accompanying drawings, in which.

DETAILED DESCRIPTION OF THE PREFERRED EMBODIMENTS

Figure 1:
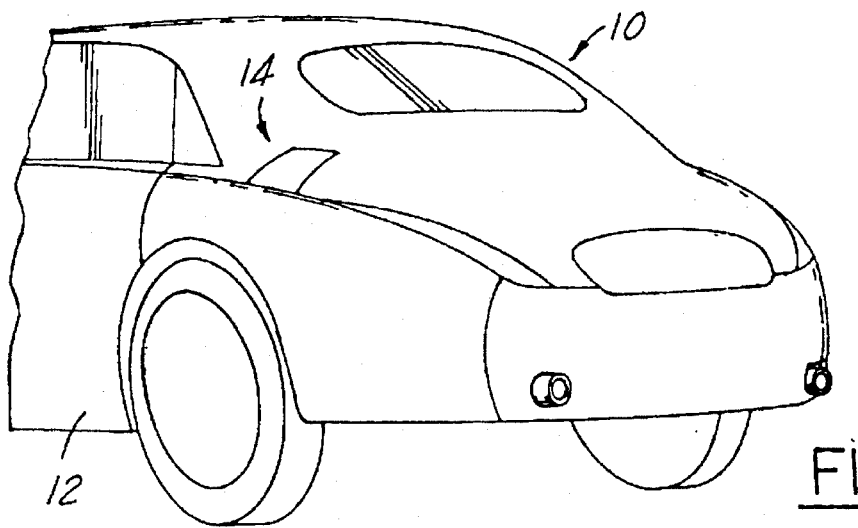
FIG. 1 is a rear perspective view of an automotive vehicle including a fuel tank cap assembly of the present invention shown in the sealing position.

Turning now to drawings, and in particular to FIG. 1 thereof, a rear end of an automotive vehicle 10 is illustrated as having a body indicated generally at 12 which includes an outer surface 14. The outer surface 14 is appropriately configured to achieve the aesthetic and aerodynamic design goals for the vehicle 10. As may best be seen in FIGS. 2 and 5, a recess 16 is formed in the external surface 14 to receive a fuel tank cap assembly 18. It is to be understood that the recess 16 may readily be formed to a variety of cross sectional shapes so as to accommodate a desired fuel tank cap assembly 18 shape which will complement outer surface 14.

Figure 11:
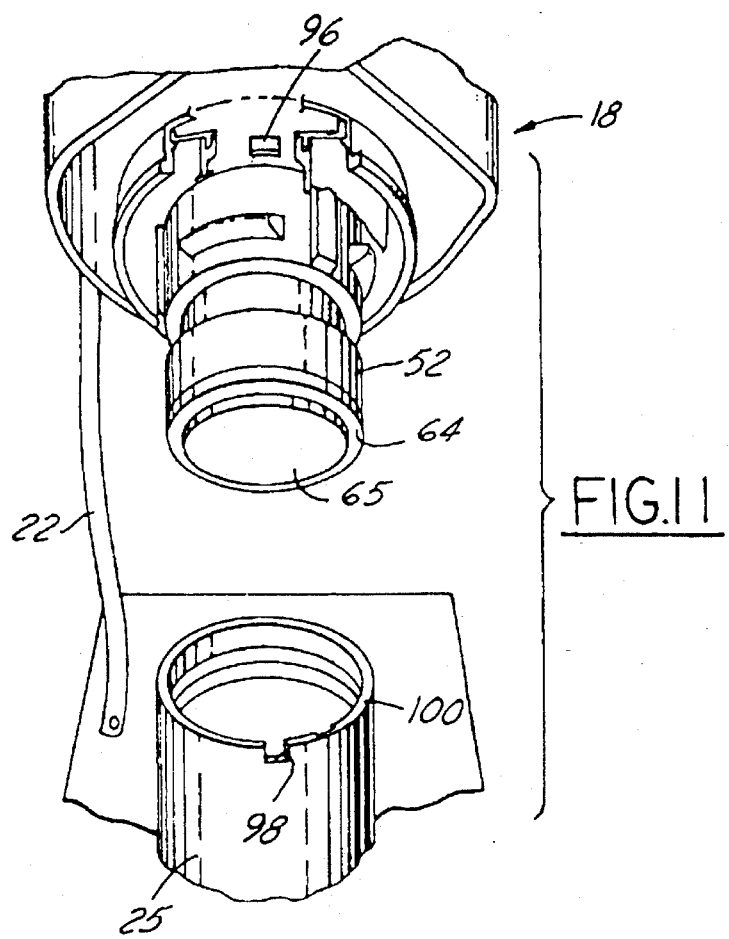
FIG. 11 is a perspective view of a fuel tank cap assembly shown in a free position above the filler pipe.
Figure 9A:
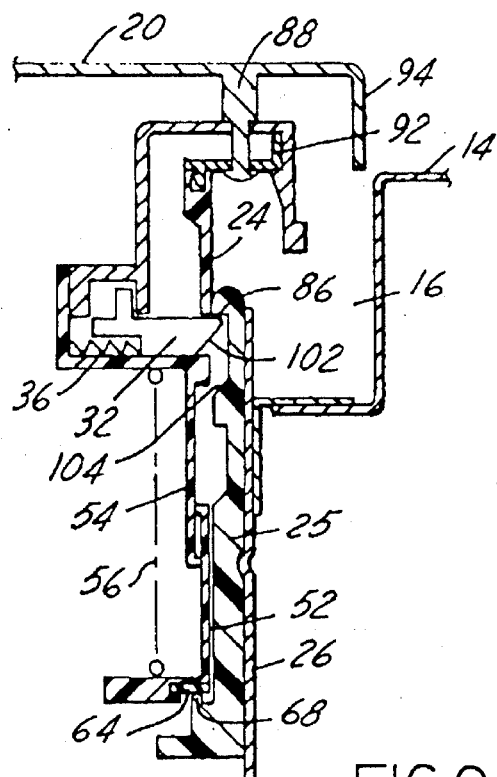
FIG. 9A is a cross-sectional view of filler pipe with a fuel tank cap assembly mounted thereon in the release position.

The fuel tank cap assembly 18 is movable with respect to the vehicle body 12 between a sealing position, as shown in FIGS. 1, 2, 5 and 6, in which fuel tank cap assembly 18 is in a position in which its outer surface is generally contiguous and blending with the external surface 14 of the vehicle body 12, and release and free positions as shown in FIGS. 9A and 11, respectively. In the release position of FIG. 9A, it is illustrated that an external surface 20 of the fuel tank cap assembly 18 is displaced from the external surface 14 of the vehicle body 12. In the free position of FIG. 11, the fuel tank cap assembly 18 is separated entirely from the vehicle, except by the connection through a flexible tether 22 which may be fastened, as shown, or hinged (not shown) to a portion of the vehicle body 12 within the recess 16, as is well known in the art.

Figure 2:
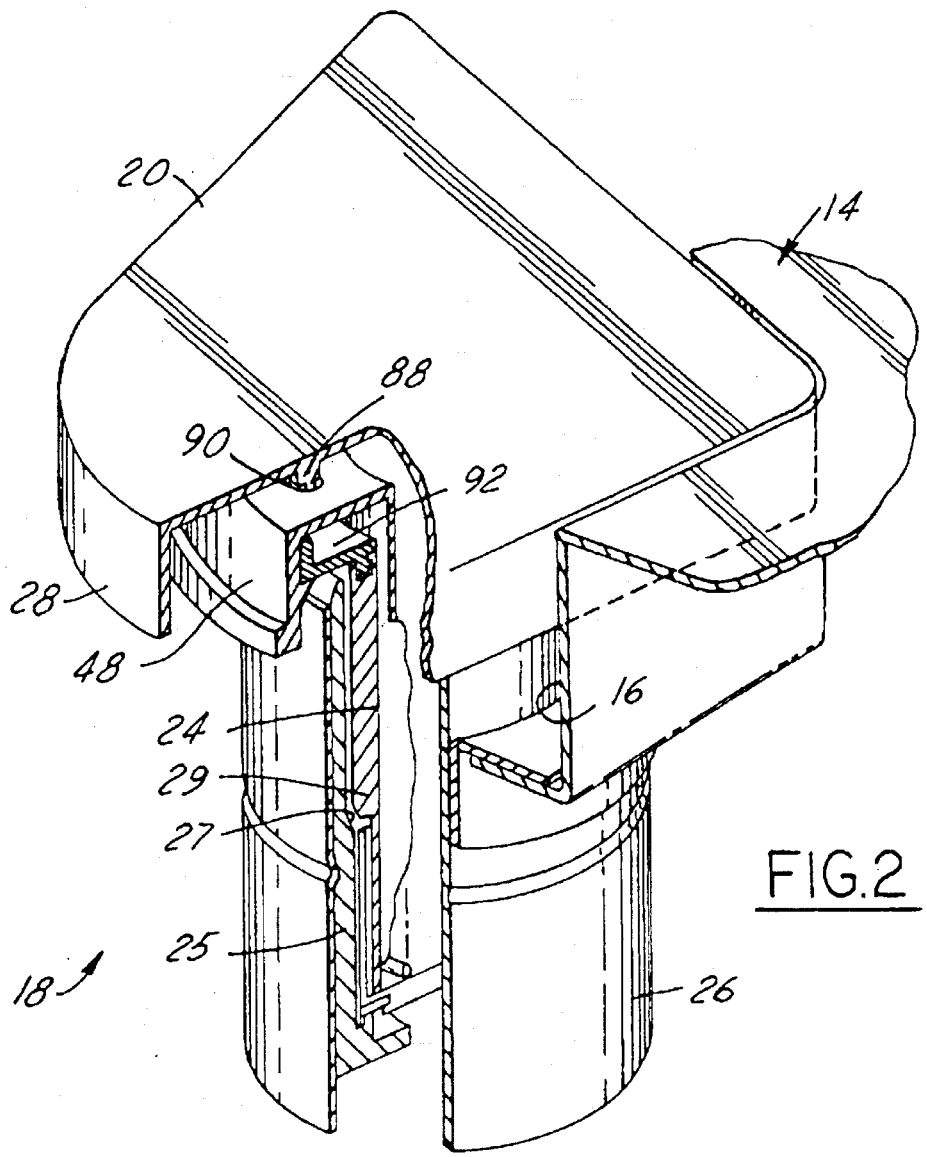
FIG. 2 is a perspective view of a fuel tank cap assembly according to the present invention shown partially cut-away and with a non-circular shaped cover portion in the sealing position.
Figure 5:
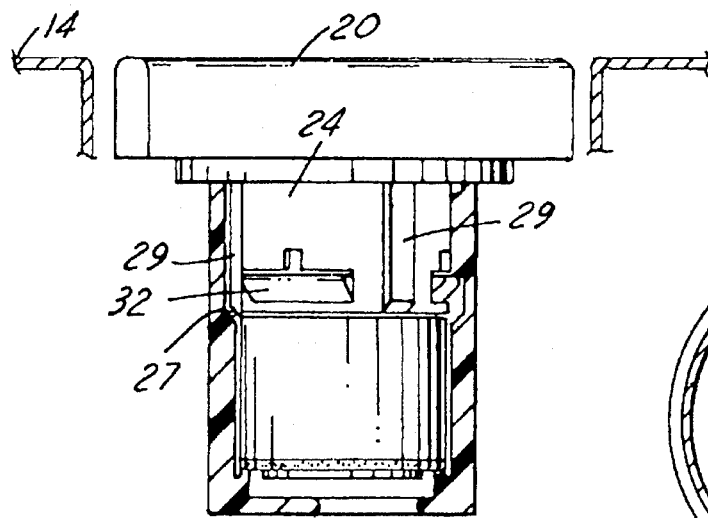
FIG. 5 is a cross-sectional view of a fuel tank cap assembly shown in the sealing position when mounted in a filler pipe.

As seen in FIG. 2, the fuel tank cap assembly 18, shown partially cut-away, has a plug portion 24 sealingly engageable with a receiver portion 25 of fuel tank filler pipe 26 by insertion therein to a rotatively fast sealing position. A cover portion 28 is carried with the plug portion 24 at one end thereof. The outer surface 20 of cover 28 is distal the plug portion 24 and substantially blends with the body external surface 14 within depression 16 when the plug portion 24 is in the sealing position (FIGS. 2 and 5).

Notches 27 may be formed in the receiver 25 to receive ribs 29 carried on the fuel tank cap assembly 18 to fix the fuel tank cap assembly 18 against rotation when in the sealing position. Hence, the sealing position of FIGS. 2, 5 and 6 are a rotatively fast position of the fuel tank cap assembly 20 with respect to the vehicle body 12.

Figure 3:
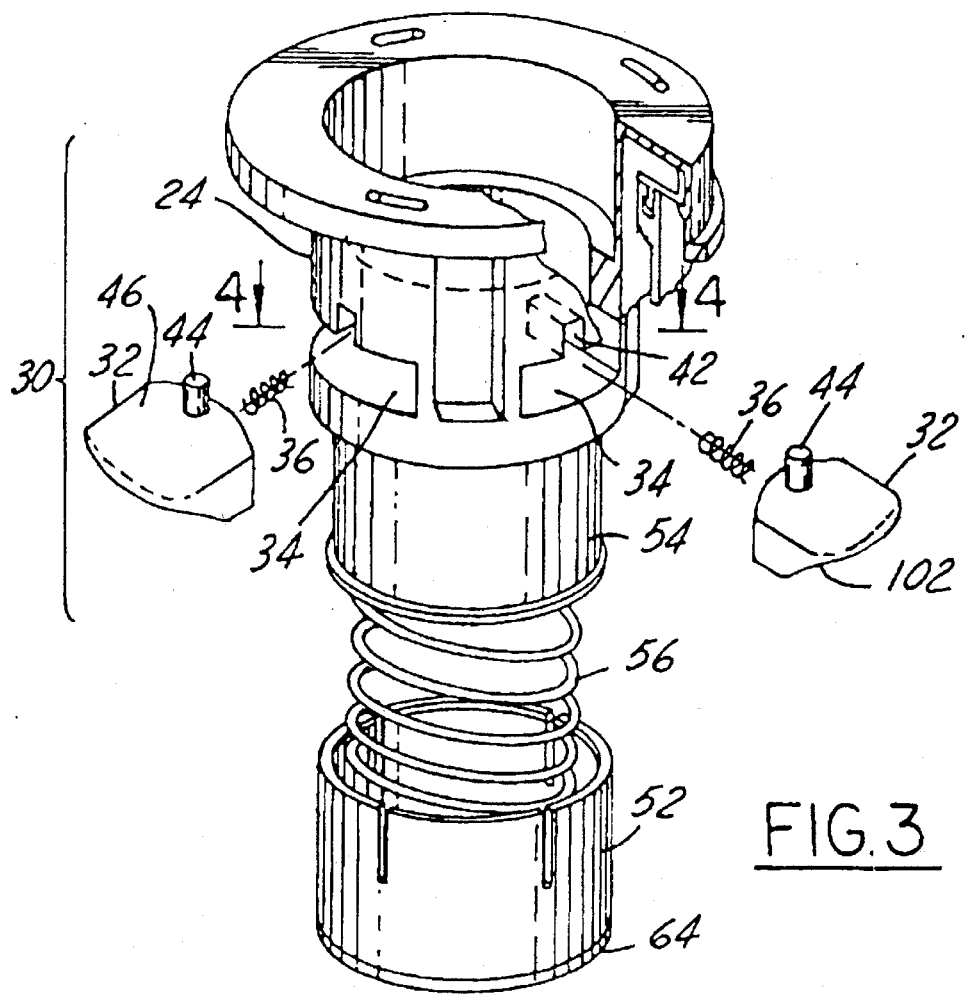
FIG. 3 is an exploded, perspective view of a plug portion of a fuel tank cap assembly of the present invention.
Figure 4:
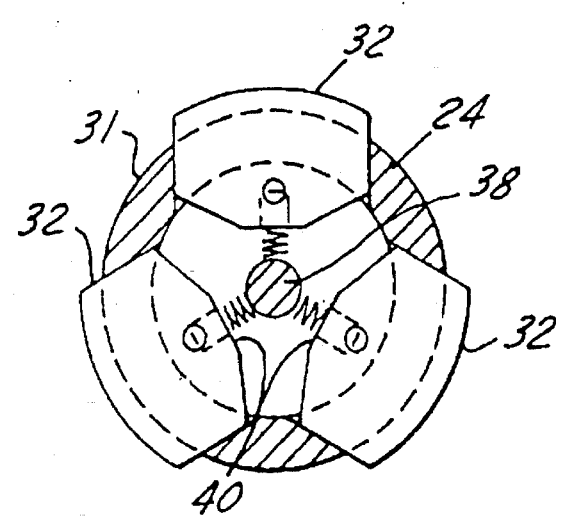
FIG. 4 is a cross-sectional view taken along line 4—4 of the plug portion shown in FIG. 3.

Turning now to FIGS. 3 and 4, a latch mechanism 30 according to the present invention is shown carried with the fuel tank cap assembly 18. The latch mechanism is operable without rotation of cover 28 to permit the assembly to move from the sealing position to a release position displaced from the body external surface 14, and is also operable in the release position through rotation of the cover 28 to permit the assembly 18 to move from the release position to a free position disengaged from the receiver 25.

Figure 8:
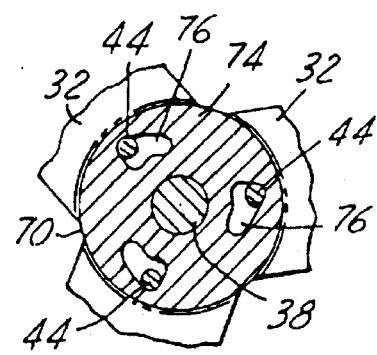
FIG. 8 is a bottom view of a ring pedestal of a latch mechanism taken along line 8—8 of FIG. 6 showing cam grooves which cooperate with jaw pins to retract jaws from catches thus unlatching the plug portion from the filler pipe.

The latch mechanism 30 has three jaws 32, preferably spaced apart approximately 120°, movable between an extended position radially outward from an outer surface 31 of plug 24, as shown in FIG. 4, and a retracted position withdrawn radially inward from surface 31 of plug 24. Jaws 32 slide within slots 34 in plug 24 (FIG. 3) and are biased toward the extended position by coil springs 36 which abut a center post 38 on one end and a rear face 40 of jaws 32 on the other end (FIG. 4). A channel 42 passes through the wall of plug 24 and receives an upwardly projecting nob 44 from an upper surface 46 of each jaw 32. The nobs 44 operatively engage a trunk portion 70 (FIG. 8) which is capable of rotation independent of the plug 24 and cover 28, as is more fully described below, for actuation of the jaws 32 between the extended position and the retracted position.

Figure 6:
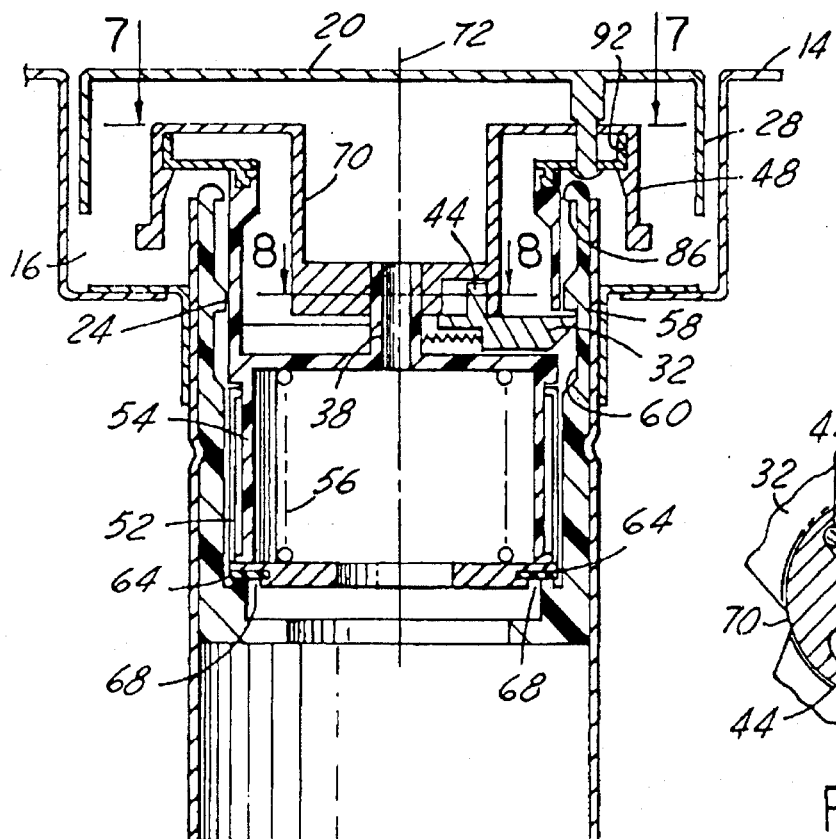
FIG. 6 is a cross-sectional view of a filler pipe with a fuel tank cap assembly according to a preferred embodiment of the present invention mounted therein in the sealing position.

The present invention can be further understood with reference to FIG. 6 which shows a cross-sectional view of the fuel tank cap assembly 18 in the sealing position when mounted in the filler pipe 26. Plug 24 is comprised of a pair of concentric cups 52 and 54, with a coil spring 56 disposed therein to form a spring-loaded, telescoping assembly (FIG. 3). Cup 54 is preferably an integral part of plug 24, while cup 52 is a separate piece. In the sealing position shown in FIG. 6, spring 56 is compressed by cups 52 and 54 and the resulting force urges the fuel tank cap assembly 18 away from the sealing position toward the release and free positions. The fuel cap assembly 18 is prevented from moving away from the sealing position by jaw 32 which engages with primary catch 58 on an inner surface 60 of the receiver 25, which is connected to the fuel tank filler pipe 26. A seal 64 is operatively disposed between cup 52 of plug 24 opposite the cover portion 28 and a plug portion seat 68 in receiver 25. Spring 56 thus pushes cup 52 against seal 64 which in turn seats against seat 68 when the fuel tank cap assembly 18 is in the sealing position. In a preferred embodiment, the seal 64 can be carried with a lower end 65 of cup 52 (FIG. 11).

It is seen that center post 38 extends upwardly toward cover portion 28 from cup 54, as viewed in FIG. 6, and receives the trunk portion 70, which on one end is distal plug 24, for rotatable movement about axis 72. A bottom face 74 of trunk portion 70 has three grooves 76 which engage with nobs 44 (FIG. 8) for retracting the three jaws 32 through a camming action when trunk portion 70 rotates around axis 72.

Figure 9B:
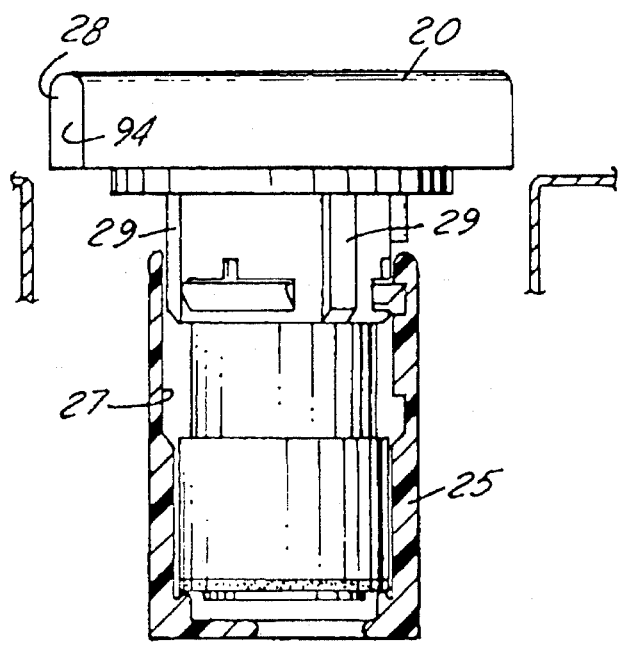
FIG. 9B is a cross-sectional view of a fuel tank cap assembly shown in the release position when mounted in a filler pipe.
Figure 12B:
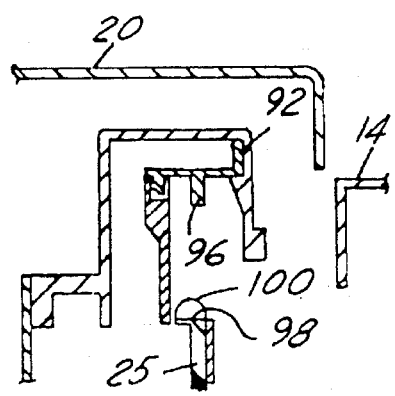
FIG. 12B is a cross-sectional view of a fuel tank cap assembly taken along a section similar to FIG. 12A but showing a tamper proof tab in an unlocked position when the fuel tank cap assembly is in a release position.

A ring member 48, which rests in the depression 16, is integral with the trunk portion 70 so that rotation of ring member 48 simultaneously rotates trunk portion 70 about axis 72, thus retracting jaws 32 to release them from primary catches 58 and allowing the fuel tank cap assembly 18 to move to the release position as shown in FIGS. 9A and 9B.

Figure 7:
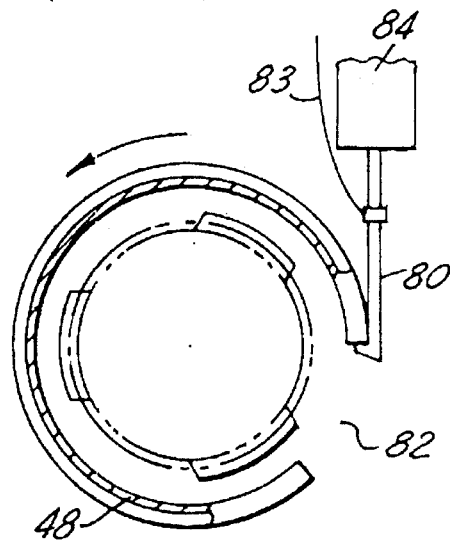
FIG. 7 is a sectional view along line 7—7 of FIG. 6 showing an actuation device for rotating a ring to actuate the latch mechanism.

When the fuel tank cap assembly 18 is in the sealing position, rotation of ring member 48 can be accomplished by a lever 80 which engages slot 82 in ring member 48, as shown in FIG. 7. Actuation of lever 80 can be by an electrically operated solenoid 84, or by a cable (not shown), both of which can be remotely triggered, for example, by a switch within the passenger compartment, such as is well known in the fuel cap art. An emergency cable 83 can also be attached to lever 80 to assist in rotating ring 48 if needed.

When lever 80 is drawn toward solenoid 84, ring member 48 rotates, which in turn rotates trunk portion 70. Jaws 32 are retracted radially inward toward center post 38 through the camming action of grooves 76 on nobs 44 (FIG. 8), thus unlatching jaws 32 from primary catches 58 (FIG. 6). Fuel tank cap assembly 18 is then urged upwardly toward the release position, as viewed in FIG. 9A, by spring 56. After fuel tank cap assembly 18 detaches from the sealing position, jaws 32 are pushed to the extended position under the radially outwardly acting force of jaw springs 36. Simultaneously, ring member 48 rotates in a reverse direction (clockwise in FIG. 7) at the urging of nobs 44 on jaws 32 in grooves 76 of trunk portion 70. It will be noted that at this point in fuel tank cap assembly 18 operation, ring member 48 has moved upwardly past lever 80 and so is not constrained thereby. When the fuel tank cap assembly 18 moves upwardly a predetermined distance, jaw 32 engages secondary catch 86, as seen in FIGS. 9A and 9B, and prevents further upward movement. The fuel tank cap assembly 18 is then in the release position with cover portion 28 displaced from the body surface 14 above depression 16 as shown in FIG. 9B.

Figure 10A:
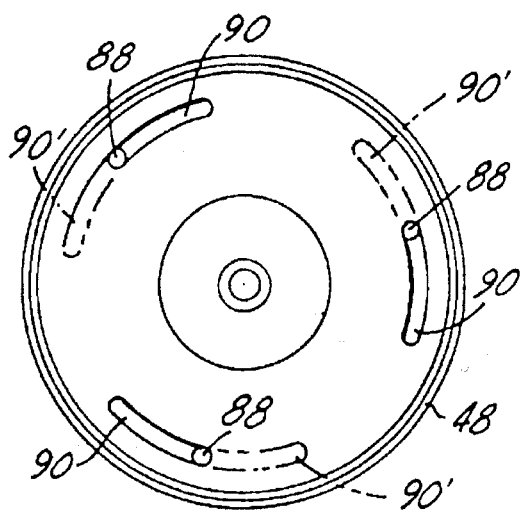
FIG. 10A is a top view of an actuation ring having slots for interacting with the cap portion to operate the latch mechanism.

Final removal of the fuel tank cap assembly 18 from filler pipe 26 can best be understood with reference to FIGS. 2, 9A, and 10. In FIGS. 2 and 9A, it is seen that the cover portion 28 has a finger 88 which extends downwardly through a slot 90 in the ring member 48 and attaches, preferably by being heat staked, to flange 92 of the plug portion 24. In a preferred embodiment, there are three fingers 88, as seen in FIG. 10A, and three slots 90 in ring member 48 for receiving fingers 88. It is important to recognize that ring member 48 can rotate counterclockwise independently of cover portion 28 since fingers 88 abut slots 90 at a leftmost end, and, as ring member 48 rotates, the circumferential arc of slots accommodates fingers 88, as seen by the dotted slots 90 in FIG. 10A. That is, fingers 88, and therefore cover portion 28, do not move as ring member 48 rotates. Thus, ring member 48 can be rotated through the action of lever 80 counterclockwise without rotation of cover portion 28 when fuel tank cap assembly 18 is in the sealing position, as described above, and irregularly shaped cover portion 28 is in depression 16 in blending contiguous relation with body surface 14.

Figure 10B:
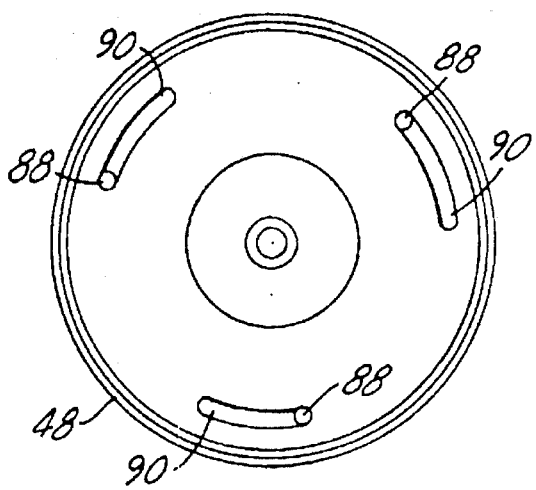
FIG. 10B is a top view of the actuation ring of FIG. 10A shown rotated counterclockwise by the cap portion to operate the latch mechanism.

In the release position, however, ring member 48 is rotated counterclockwise by the interaction of fingers 88 with slots 90. To effect removal of the fuel tank cap assembly 18 from the filler pipe 26 when in the release position, the cover gripping surface 94 of cover portion 28, which is standing proud of the vehicle body surface 14 (FIG. 9B), is grasped and rotated counterclockwise (approximately one eighth-turn, or 17°) so that ring member 48, which moves in conjunction therewith, rotates an equal distance, as seen in FIG. 10B. Rotation of ring member 48 draws the jaws 32 inward through a camming action, as described above, allowing for release of plug portion 24 from the secondary catch 86 on receiver 25 of filler pipe 26. The fuel tank cap assembly 18 is then pushed by spring 56 to the free position of FIG. 11.

Figure 12A:
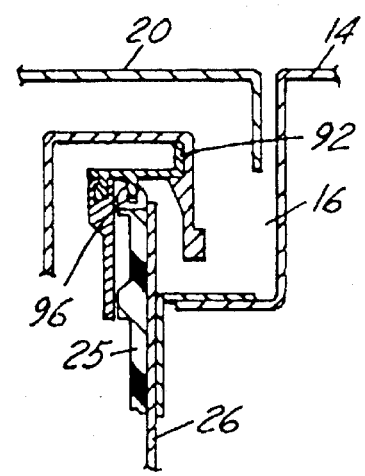
FIG. 12A is a cross-sectional view of a fuel tank cap assembly taken along a section showing a tamper proof tab in a locked position when the fuel tank cap assembly is in the sealing position.

In an embodiment having a circular shaped cover portion (not shown), rotation of the cover portion when fuel tank cap assembly 18 is in the sealing position is prevented by a tamper proof feature as hereafter described. As seen in FIG. 11, a downstanding tab 96 descends from flange 92 for engagement with a notch 98 on the upper circumference 100 of receiver 25. When in the sealing position, rotation of cover 28 is not possible due to the downstanding tab 96 engaging with the notch 98, as best seen in FIG. 12A. In the release position, however, tab 96 has disengaged from notch 98 in receiver 25 as flange 92 has moved upward. Cover portion 28 can therefore be rotated freely as described above.

Fuel tank assembly cap 18 installation is accomplished by locating the assembly in the receiver 25 opening with ribs 29 engaging notches 27, and applying a downward (inward) force. There will be two clicks as the jaws 32 move past secondary catch 86 and into primary catch 58. A visual inspection guarantees that the cap has been properly installed. Jaws 32 have a beveled bottom area 102 (FIG. 9A) which cooperates with a similarly beveled region 104 on inner face 106 of receiver 25 to force jaws 32 radially inward during reinstallation of fuel tank cap assembly 18.

In a preferred embodiment, jaws 32, plug 24, and ring member 28 can all be made of a hard plastic material such as acetal.

Although the preferred embodiment of the present invention has been disclosed, various changes and modifications may be made without departing from the scope of the invention as set forth in the appended claims.

I claim:

1. A fuel tank cap assemble for an automotive vehicle having a body with an external surface, a fuel tank filler pipe having an open end adjacent the body external surface and a depression formed in the body external surface and defining a generally continuous annular surface around the fuel tank filler pipe, the fuel tank cap assembly comprising:

a plug portion sealingly engageable with the fuel tank filler pipe by insertion into the filler pipe to a rotatively fast sealing position;

a cover portion carried with said plug portion at one end of said plug portion and having an outer surface distal from said plug portion that substantially blends with the body external surface within said depression when said plug portion is in said sealing position; and a latch mechanism carried with said fuel tank cap assembly operable without rotation of said cover to permit said assembly to move from said sealing position to a release position displaced from the body external surface, said latch mechanism operable in said release position through rotation of said cover to permit said assembly to move from said release position to a free position disengaged from said filler pipe.

2. A fuel tank cap assembly as defined in claim 1 wherein said latch mechanism is remotely actuated when said plug is in said sealing position.

3. A fuel tank cap assembly as defined in claim 1 wherein said plug portion comprises a spring-loaded, telescoping assembly operatively disposed to urge said fuel tank cap assembly away from said sealing position toward said free position.

4. A fuel tank cap assembly as defined in claim 3, and further comprising a seal member operatively disposed between the end of said plug portion opposite the cover portion and a plug portion seat in the fuel tank filler pipe.

5. A fuel tank cap assembly as defined in claim 1, wherein said latch mechanism engages with a primary catch means on said filler pipe for releasably securing said fuel tank cap assembly in said sealing position.

6. A fuel tank cap assembly as defined in claim 5, wherein said latch mechanism engages with a secondary catch means on said filler pipe for releasably securing said fuel tank cap assembly in said release position.

7. A fuel tank cap assembly as defined in claim 6 wherein said primary and secondary catch means are positioned within said depression.

8. A fuel tank cap assembly as defined in claim 1, and further comprising tamper-proof means to prevent rotation of said cover portion when said fuel tank cap assembly is in the sealing position.

9. A fuel tank cap assembly for an automotive vehicle having a body with an external surface, a fuel tank filler pipe having an open end adjacent the body external surface and a depression formed in the body external surface and defining a generally continuous annular surface around the fuel tank filler pipe, the fuel tank cap assembly comprising:

(1) a plug sealingly engageable with the fuel tank filler pipe by insertion into the filler pipe to a rotatively fast sealing position;

(2) a cover carried with the plug at one end thereof and having an outer surface distal from the plug that substantially blends with the body external surface within the depression when the plug is in the sealing position; and (3) a latch mechanism carried with the fuel tank cap assembly operable without rotation of the cover to permit the assembly to move from the sealing position to a release position displaced from the body external surface, the latch mechanism operable in the release position through rotation of the cover to permit the assembly to move from the release position to a free position disengaged from the filler pipe, the latch mechanism comprising:

(a) stop means in the plug movable between an extended position radially outward from the plug so as to engage a catch on the filler pipe, and a retracted position withdrawn radially inward toward the plug and disengaged from the catch and (b) actuation means rotatable independent of the cover and the plug for moving the stop means between the extended position and the retracted position.

10. A fuel tank cap assembly as defined in claim 9 wherein the stop means comprises at least one jaw carried in the plug and biased toward the extended position and operatively engaged with the actuation means so as to retract radially inward toward the plug upon rotation of the actuation means to disengage from the catch.

11. A fuel tank cap assembly as defined in claim 10 wherein the actuation means comprises:

(1) a trunk portion having a first end distal the plug with at least one cam groove engaged with the at least one jaw; and (2) a ring member attached to a second end of the trunk operable to rotate the trunk so as to retract the at least one jaw through the camming action of the at least one cam groove.

12. A fuel tank cap assembly as defined in claim 11 wherein the plug comprises a spring-loaded, telescoping assembly operatively disposed to urge the fuel tank cap assembly away from the sealing position toward the free position.

13. A fuel tank cap assembly as defined in claim 12 wherein the ring member is rotated by a remotely actuated lever when the plug is in the sealing position to retract the at least one jaw from the catch thus permitting the plug assembly to push the fuel tank cap assembly to the release position.

14. A fuel tank cap assembly as defined in claim 13 wherein the ring member is rotated by the cover when the plug is in the release position to retract the at least one jaw from the catch thus allowing the plug assembly to push the fuel tank cap assembly to the free position.

15. A fuel tank cap assembly as defined in claim 14, and further comprising a tab extending downward from the cover and engageable with a notch in the filler pipe to prevent rotation of the cover when the fuel tank cap assembly is in the sealing position.

* * * * *